Figures 2, 3:
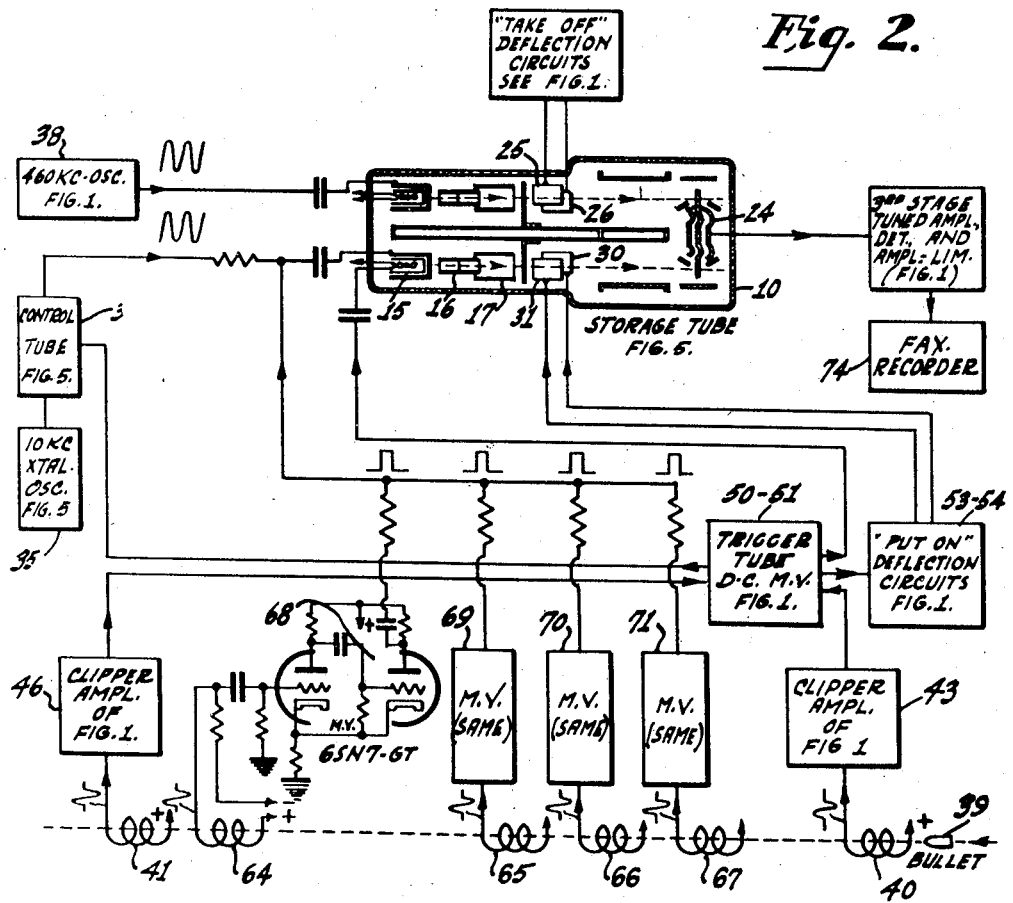

Nov. 5, 1946.　　　　J. P. SMITH　　　　2,410,755
MEASURING SYSTEM
Filed July 25, 1944　　　　5 Sheets-Sheet 1
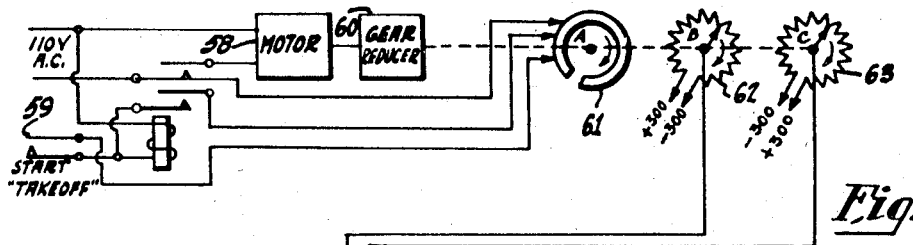
*Fig. 1.*
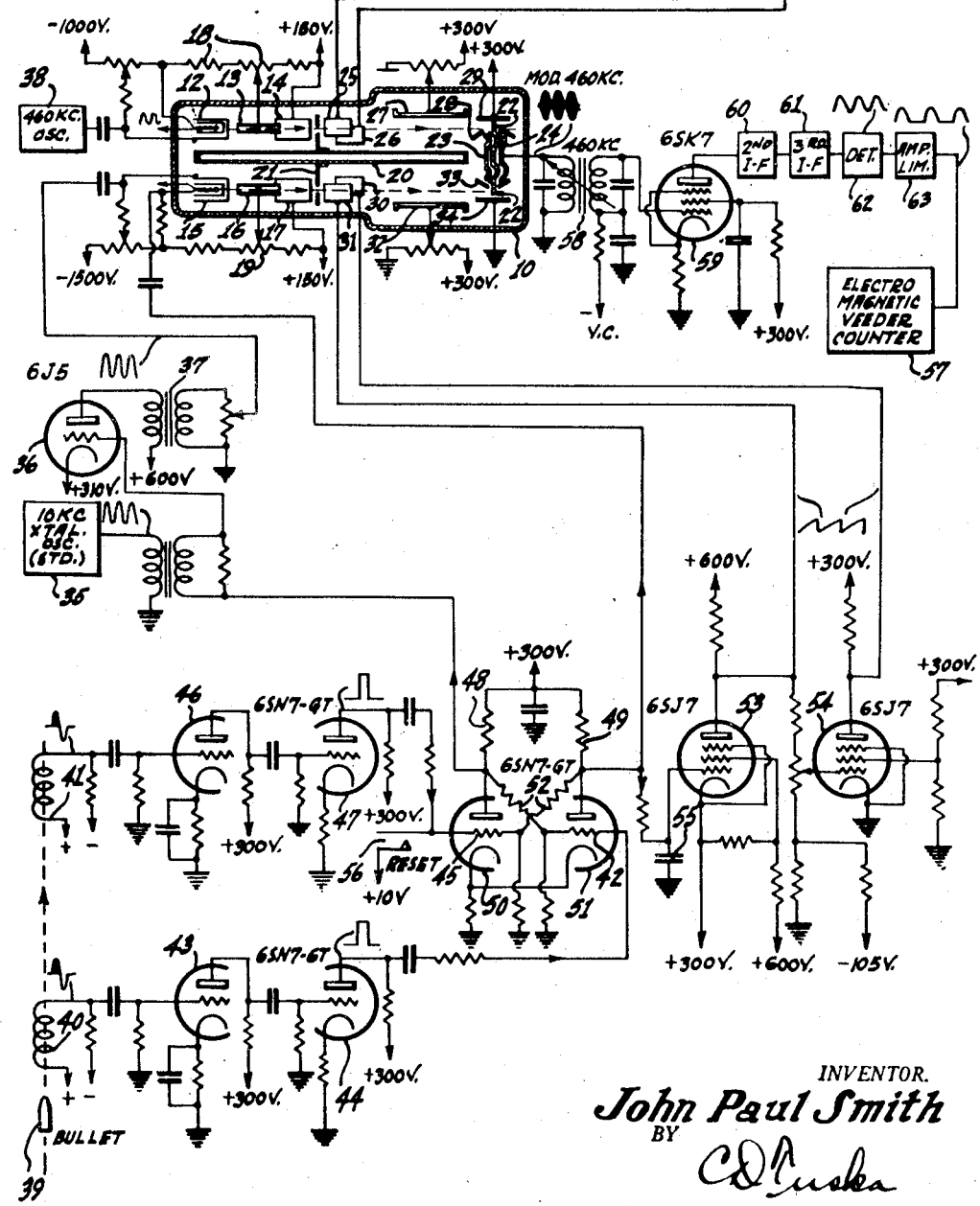
INVENTOR.
*John Paul Smith*
BY
*C D Cuska*
ATTORNEY INVENTOR.
John Paul Smith
BY
ATTORNEY Nov. 5, 1946.  J. P. SMITH  2,410,755
MEASURING SYSTEM
Filed July 25, 1944  5 Sheets-Sheet 3

Inventor
John Paul Smith
Attorney

Nov. 5, 1946.   J. P. SMITH   2,410,755
MEASURING SYSTEM
Filed July 25, 1944   5 Sheets-Sheet 5
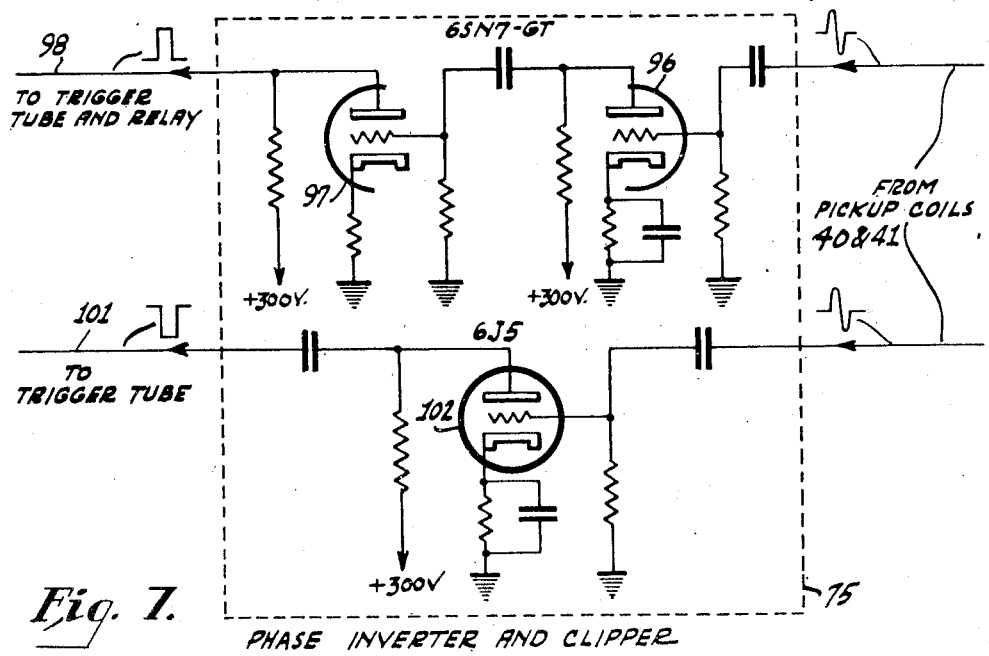
Fig. 7.   PHASE INVERTER AND CLIPPER
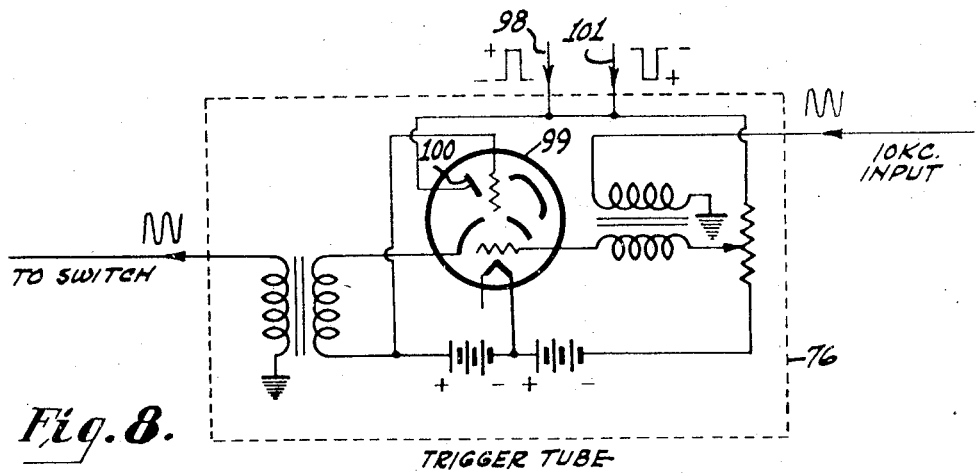
Fig. 8.   TRIGGER TUBE
INVENTOR.
John Paul Smith
BY
ATTORNEY Patented Nov. 5, 1946

2,410,755

UNITED STATES PATENT OFFICE 2,410,755

MEASURING SYSTEM

John P. Smith, Cranbury, N. J., assignor to Radio Corporation of America, a corporation of Delaware Application July 25, 1944, Serial No. 546,543

10 Claims. (Cl. 161—15)

This invention relates to measuring systems such as are suitable for the measurement of the time interval required for an object to traverse the distance between two points or the like. It has for its principal object the provision of an improved system and method of operation whereby time is measured in terms of electrical charges which may be counted or recorded at a rate much slower than that at which they were established, thus permitting very short intervals of time to be computed by mechanical counters or other slowly acting devices.

The invention includes, among other things, a cathode ray tube (such as that disclosed by a copending application of Iams et al. Ser No. 492,- 658, filed June 26, 1943) which is provided with a multi-element electrode on which electrical charges are stored transversely in response to the positive half cycles of high frequency impulses applied to the control grid of the tube. Associated with the cathode ray tube are means for starting and stopping the application of high frequency impulses to its grid in response to different positions of the object under observation, and for simultaneously controlling movement of the cathode ray or electron beam along the multi-element electrode of the tube. The resulting electrical charges are stored at a relatively rapid rate under conditions such that secondary electron emission from the multi-element electrode is less than unity.

Also associated with the cathode ray or storage tube (hereinafter sometimes called a commutator tube) are means for removing the charges from the multi-element electrode at a rate which is slow enough to permit the use of a mechanical counter for computing the number of high frequency cycles passed by the control grid of the tube to its multi-element electrode. When this number is known, the time required for the object to travel between predetermined observation points is readily ascertained.

The measuring system of this invention has uses other than that of measuring the time required for an object to traverse the distance between predetermined points. For example, it is adapted to the measurement of any quantity susceptible of being represented by a series of electrical charges distributed transversely of the multi-element electrode or the equivalent.

Important objects of the invention are the provision of an improved time-measuring system which utilizes counters of well-known types; the provision of an improved system for measuring the speed of projectiles and the like; and the provision of means for measuring, in terms of successively established electrical charges, any quantity susceptible of being represented by such charges.

The invention will be better understood from the following description considered in connection with the accompanying drawings, and its scope is indicated by the appended claims.

Figure 4:
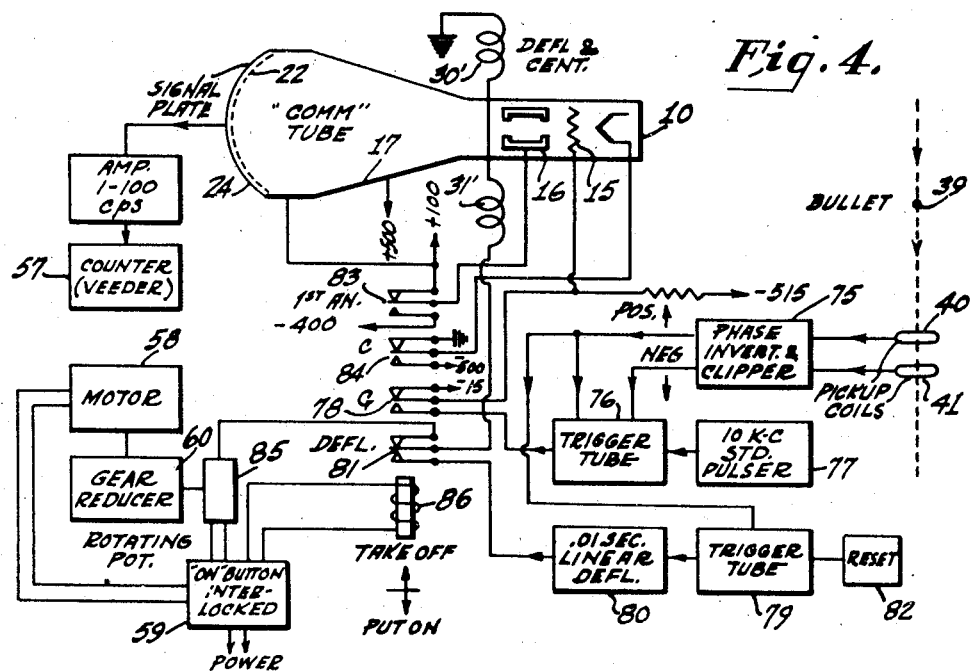

Referring to the drawings:

Figure 1 is a wiring diagram of a measuring system embodying the invention in a form suitable for measuring the instantaneous velocity of an object, Figure 2 is a similar diagram of a modification adapted to measure the velocity of an object at different points in its path of travel, Figure 3 is an explanatory diagram showing a type of record produced by the apparatus of Fig. 2, Figures 4, 5 and 6 illustrate systems similar to those of Figs. 1 and 2, with the exception that the cathode ray or commutator tube is provided with only one electron gun and has associated with it means for utilizing this gun both to put on and take off the charges of the multi-element electrode, Figure 7 is a wiring diagram of a phase inverter and clipper circuit which is interposed between the pick-up coils and the trigger tube of the system shown by Fig. 4, and Figure 8 illustrates a trigger tube which may be used to start and stop the application of high frequency impulses to the multi-element of the commutator tube.

The system of Fig. 1 includes a storage or commutator tube 10 which has a pair of electron guns 12—13—14 and 15—16—17 arranged to form separate electron beams which are spaced from one another within the tube. Potentials for operating these guns are derived from a suitable source through voltage dividers 18 and 19. A mounting plate and shield 20, provided with an apertured flange 21, is positioned between the paths followed by the electron beams formed by the guns 12—13—14 and 15—16—17.

The multi-element or composite target of the tube 10 includes a plurality of conductors 22, accurately spaced from one another and clamped between mica plates which are held against the wires by a metal plate 23 and a metal signal output plate 24. There may be, for example, 400 such wires parallel with one another in the same plane, each one inch long, and protruding at opposite ends from between the plates by a distance of ⅛ inch, to form a sort of double-edged comb.

The point of contact between the beams and the target is along the edges of this comb. Otherwise stated, the beam of the gun 12—13—14 moves across the upper ends of the wires 22 and the beam of the gun 15—16—17 moves across the lower ends of the wires 22.

The beam of the gun 12—13—14 passes to the target through one aperture in the shield 21, between deflectors 25—26, between shield 20 and a centering deflector 27, and between secondary electron collectors 28 and 29. The beam of the gun 15—16—17 passes to the target through a different aperture of the shield 21, between deflectors 30 and 31, between the shield 20 and a centering deflector 32, and between secondary electron collectors 33 and 34. The beam of the gun 15—16—17 is utilized to establish electrical charges linearly across the lower ends of the wires 22 and the beam of the gun 12—13—14 is utilized to remove these charges. The rates at which these charges are established and removed are obviously dependent on the voltages applied to the deflectors 30—31 and 25—26 and may be made to have any desired relation. In the illustrated embodiment of the invention, the electrical charges are established on the lower ends of the wires 22 at a very rapid rate and are removed at a much slower rate.

To this end, the anode voltage of gun 15—16—17 is adjusted for a secondary electron emission of less than unity, while the anode voltage of the gun 12—13—14 is adjusted for a secondary electron emission of more than unity. Under these conditions, negative electrical charges are established across the conductors 22, in response to the positive half cycles of impulses delivered from a 10-k. c. generator 35 through a triode 36 and a transformer 37 to the control grid of the gun 15—16—17. These charges are removed from the upper ends of the wires 22 in response to high frequency impulses supplied from a 460-k. c. impulse generator 38. The output of the tube 10 delivered at the target plate 24 is a 460-k. c. signal, which is modulated by the charges on the wires 22 at a rate determined by the speed at which the beam of the gun 12—13—14 is deflected. This speed of deflection is determined by the rate at which the potential between the deflectors 25—26 is changed.

Since the high frequency impulses of the oscillator 35 are applied to the control electrode 15 of the cathode ray tube 10 only during the time interval between the occurrence of two events, such as the passage of the bullet 39 between the coils 40 and 41, it follows that there are established across or transversely of the multi-element electrode of the tube 10 a series of separate electrical charges which (1) are representative of the positive half cycles of the impulses delivered by the oscillator 35, and (2) continue to be established only so long as the bullet 39 is between the coils 40 and 41. The charges thus established vary in magnitude from conductor to conductor of the electrode, reaching the highest value when the instantaneous voltage of the positive half cycle is a maximum. During the removal of these charges, they modulate impulses delivered from a high frequency oscillator 38 and are thereafter detected and counted or recorded.

The electrical charges at the lower ends of the wires 22 are established during a time interval which is determined by the travel of a projectile between a pair of pickup coils 40 and 41.

It will be noted that the coil 40 is coupled to one grid 42 of a multivibrator unit through triodes 43 and 44, and that the coil 41 is coupled to another grid 45 of the multivibrator through triodes 46 and 47. With these connections, a positive pulse is applied to the grid 42 in response to passage of the projectile 39 through the coil 40. Similarly a positive pulse is applied to the grid 45 when the projectile 39 passes through the coil 41.

The multivibrator unit is of a well-known type which includes anode resistors 48 and 49, triodes 50 and 51 and grid resistors 52, each interposed between the anode of one triode and the grid of the other triode. In the operation of such a multivibrator or trigger unit, only one of the triodes conducts current at a time and current is transferred from one triode to the other in response to the application of a positive pulse to the grid of the triode which is not conducting. Thus, if the triode 50 is conducting and a positive pulse is applied to the grid 40 of the triode 51, current is transferred from the triode 50 to the triode 51, and vice versa.

The potential drops of the resistors 48 and 49 are utilized to control the connection between the generator 35 and the grid of the gun 15—16—17. They also control the connection between the deflectors 30—31 and the pentodes 53 and 54, through which deflecting potential is applied from a capacitor 55 connected to the anode of the triode 51. Potential is also applied from the anode of the triode 51 to the grid of the gun 15—16—17 for blanking its beam. A reset switch 56 is provided for establishing a standby condition with current in the triode 50 of the trigger unit.

With current in the triode 50, passage of an object through the coil 40 produces at the grid 42 a positive impulse whereby current is transferred to the triode 51 and a more negative voltage (due to the potential drop of the resistor 49) is applied to the capacitor 55 and to the cathode of the gun 15—16—17, thereby unblanking the beam of this gun and operating through the pentodes 53 and 54 to start movement of the beam across the lower ends of the wires 22. At the same time, a more positive potential is applied to the grid of the triode 36, thereby passing high frequency impulses from the generator 35 to the control grid of the gun 15—16—17 and producing on the lower ends of the wires 22 an electrical charge for each cycle of these impulses. Due to the movement of the beam, these charges are arranged in linear relationship with one another.

When the object 39 passes through the coil 41, a positive pulse is applied to the grid 45 of the triode 50, current is transferred from the triode 51 to the triode 50 of the trigger unit, the beam of the gun 15—16—17 is blanked out, the supply of high frequency oscillations through the triode 36 to the grid of the gun 15—16—17 is interrupted, and the deflectors 30—31 have their potentials changed to a value adapted to re-establish the beam in its original starting position.

The time required for the object 39 to traverse the distance between the coils 39 and 41 is readily determined by counting the number of 10-k. c. cycles passed while the object is between the coils. These cycles, represented by electrical charges linearly disposed on the wires 22, are counted at a much lower rate than they are produced.

These linearly disposed electrical charges are removed from the wires 22, one after another, in response to movement of the electron beam of the gun 12—13—14 and are registered in a counter 57 which is coupled to the output plate 24 through a transformer 58, a pentode 59, second and third intermediate frequency amplifiers 60 and 61, a detector 62 and an amplitude limiter 63. As previously indicated, there is delivered from the output plate 24 a 460-k. c. signal which is derived from the generator 38 and is modulated at a frequency determined by the speed at which the electrical charges are removed from the wires 22.

Removal of the charges from the wires 22 is effected under conditions such that (1) secondary electron emission is greater than unity and (2) the beam is moved across the upper ends of the wires 22 at a speed determined by the speed of a motor 58. This motor is controlled through a switch 59 and functions through a speed reduction gear 60 to rotate a single segment commutator 61 and potentiometers 62 and 63. Rotation of the contact members of the potentiometers 62 and 63 gradually varies the potential between the deflectors 25 and 26, so that the beam is moved across the upper ends of the wires 22. Rotation of the commutator 61 serves to interrupt the circuit of the motor 58 at the end of each revolution, thus completing the cycle of operation.

The system of Fig. 2 is similar to that of Fig. 1 in many respects, but differs therefrom in that it is adapted to measure change in the velocity of an object as it moves between successive points. As illustrated in Fig. 2, it produces a record such as that shown by Fig. 3, wherein the moving object 39 is shown at successive points in its travel and its change in velocity as it passes from point to point is indicated.

In Figs. 1 and 2, similar parts are indicated by the same reference numerals. Thus, the coils 40 and 41 of Fig. 2 function in the same manner as the similarly designated coils of Fig. 1, and other parts common to the two figures function as explained in connection with Fig. 1.

Interposed between the coils 40 and 41 of Fig. 2 are additional coils 64 to 67, which are connected to the grid of the gun 15—16—17, respectively, through trigger units 68 to 71. Passage of the object 39 through the coils 67, 66, 65 and 64 in each case trips the corresponding trigger circuit 71, 70, 69 or 68 and produces a marker pulse 72 (see Fig. 3), which is applied to the grid of the gun 15—16—17 together with the 10-k. c. impulses supplied from the oscillator 35. The amplitudes of the marker pulses are made greater than those of the 10-k. c. pulses 73, so that the marker pulses 72 print blacker on the facsimile recorder 74, to which the output plate 24 is connected through an amplifier, as indicated in Fig. 2. Knowing the distance between the coils or marker pulses, the velocity of the object at different points in its travel is readily determined. Such data is useful for plotting curves of velocity versus distance and the like.

In the system of Fig. 4, the storage tube 10 (shown more or less diagrammatically) is the same as that of Figs. 1 and 2, with the exception that (1) it includes only one electron gun, (2) the deflectors 30 and 31 are replaced by deflecting coils 30' and 31' and (3) it has associated with it such relay and switching means as are required for utilizing the single beam of the tube both for putting on and taking off the charges of the wires 22.

In this modification of the invention, the outputs of the pickup coils 40 and 41 are supplied through a phase inverter and clipper 75 (details shown in Fig. 6) to a trigger tube 76 (details shown in Fig. 7), which controls the supply of 10-k. c. impulses from the generator 77 through a switch 78 to the grid 15 of the tube 10.

The output of the "put on" pickup coil 40 is also supplied to a trigger tube 79 which is the same as the tube 76 and functions through a source of deflecting current 80 and a switch 81 to energize the deflecting coils 30' and 31', when the object 39 passes through the first pickup coil 40. For returning the beam to its starting or standby position, a reset switch 82 is provided for applying a negative pulse to the trigger tube 79 as hereinafter explained.

From the foregoing explanation, it is evident that the system of Fig. 4 operates to establish charges on the wires 22 in the same manner as the systems of Figs. 1 and 2. The taking off and counting of these charges by the counter 57 involves certain switching operations which are performed by the parts shown at the lower left-hand corner of Fig. 4.

These parts include a plurality of double throw switches 83, 84, 78 and 81. The switch 83 connects the first anode 16 to a —400 volt lead in its lower position and to a +100 volt lead in its upper position. The switch 84 connects the cathode of the tube 10 to a —500-volt lead in its lower position and to ground in its upper position. The switch 78 connects the grid 15 to the trigger tube 76 in its lower position and to a —15 volt lead in its upper position. The switch 81 connects the deflecting coils 30' and 31' to the source 80 in its lower position and to a potentiometer 85 in its upper position.

The potentiometer 85 may be of a type similar to the potentiometer 62 and 63 of Fig. 1. Its contact arm is moved by the motor 58, which is coupled to the potentiometer through the gear 60 and is supplied with power through the control switch 59. The switch 59 also controls the supply of operating current to the potentiometer 85 and to a "put on" and "take off" relay 86, by which the switches 83, 84, 78 and 81 are moved simultaneously to their upper or "take off" positions.

With the switches in their "take off" positions, the potentiometer is rotated to vary the current of the coils 30' and 31'' by which the beam is moved across the ends of the wires 22 and their charges are removed at a relatively low rate and counted by the counter 57, as previously described in connection with Figs. 1 and 2.

Figure 5:
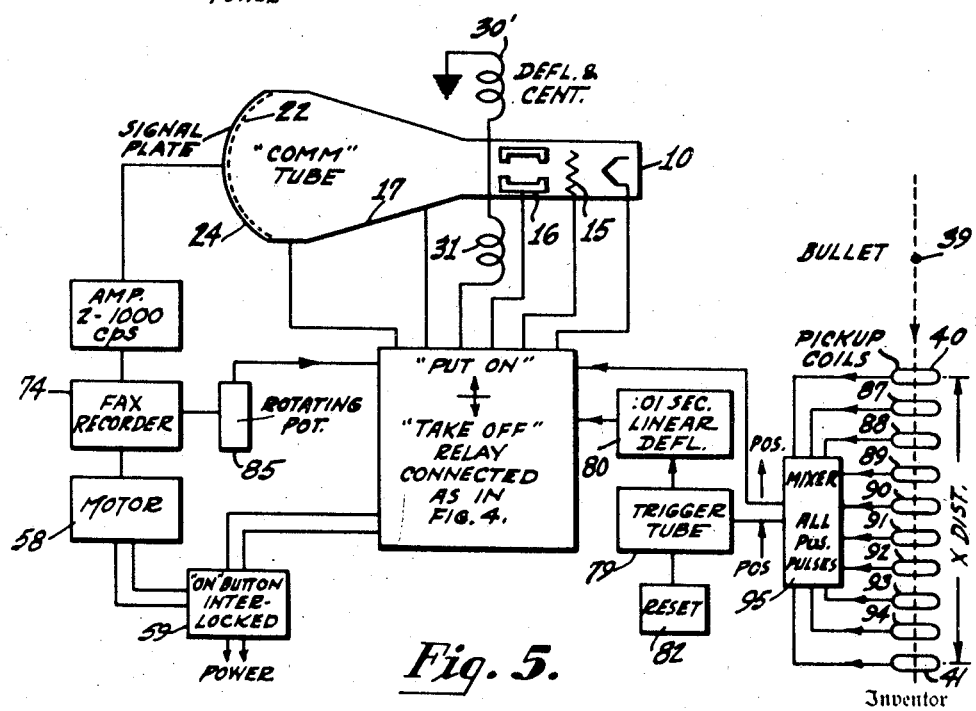

The system of Fig. 5 is similar in some respects to that of Fig. 4 and in other respects to that of Fig. 2. It includes a plurality of pickup coils 87 to 94 which are suitably spaced between the coils 40 and 41. When the object 39 passes through the coil 40, the beam of the tube 10 starts to move. During this movement, a positive pulse is applied through a mixer 95 to the grid 15 each time the object 39 passes through one of the coils 87 to 94. The resulting charges on the conductors 22 are removed as in the system of Fig. 4 and are registered by the recorder 74. The beam is returned to its standby position in response to operation of the reset switch 82.

Figure 6:
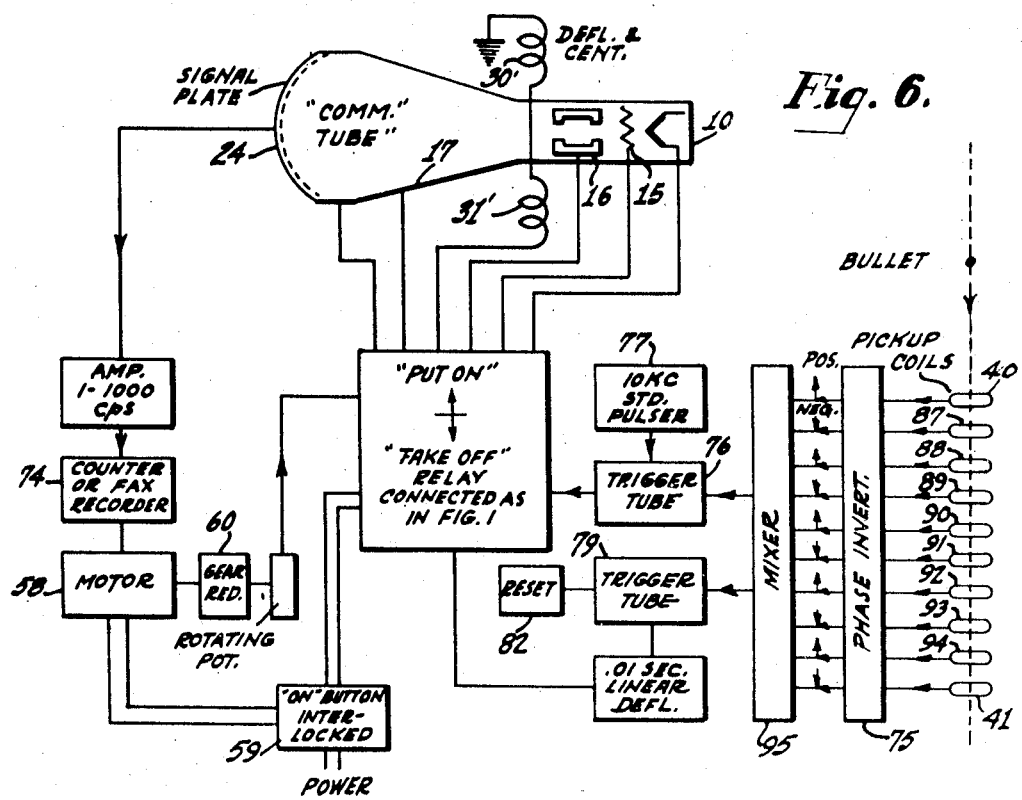

The system of Fig. 6 differs from that of Fig. 5 in that the pickup coils are arranged in pairs, one for each section under measurement. The starting pulse for the trigger tube 76 is positive and its stopping pulse is negative. The trigger tube starts deflection in response to the first positive pulse, but is unaffected by the negative pulses which occur when the object passes through the second coil of each pair. There are thus produced on the wires 22 group of charges, one for each pair of coils. The charge "take off" procedure is the same as that previously described. This system functions with somewhat greater accuracy than that of Fig. 5, but requires more apparatus.

Fig. 7 is a wiring diagram of a phase inverter and clipper, such as that illustrated by the box 75, and Fig. 8 is a wiring diagram of a trigger tube, such as that illustrated in Fig. 4 by the boxes 75 and 79.

As indicated by Fig. 7, the output from the pickup coil 40 is transmitted through a channel including triodes 96 and 97, to produce at an output lead 98 a pulse of positive polarity. This is utilized, as previously explained, to initiate movement of the beam of the tube 10 and to start the application of high frequency impulses to its control grid. To this end, the positive pulse is applied to an electrode 100 of a tube 99 (see Fig. 8), which permits the passage of 10-k. c. impulses from the generator 77 of Fig. 4 through the switch 78 to the grid 15, for example. This application of high frequency impulses to the grid 15 continues until a negative pulse is applied to the electrode 100 through the lead 101, in response to passage of the object through the coil 41. The output of the coil 41 is transmitted to the lead 101 through a channel which includes the triode 102 (see Fig. 7).

The tube 99 is of the secondary electron emission, electron multiplier type. It functions to start or stop the application of high frequency impulses to grid of the tube 10 in about one microsecond. A more complete description of it is to be found in the Bell Laboratories Record for April, 1943, at page 233.

It is apparent that the multivibrator 50—51 of Fig. 1 and the tube 99 of Fig. 4 perform the same functions and may be interchanged with one another without affecting the result produced. Other rearrangements of the parts of the various figures may likewise be made without surrendering the advantages of the present invention.

I claim as my invention:

1. The combination of means for forming an electron beam, means for subjecting said beam to high frequency impulses, a plurality of conductive elements electrically insulated from one another, and means responsive to control impulses separated by predetermined time intervals for operating said beam to establish on said elements electrical charges which are separately positioned to represent instantaneous values of successive half-cycles of said high frequency impulses, and means including said beam-forming means for dissipating said charges at a rate which is low with respect to the rate at which said high frequency impulses follow one another.

2. The combination of means for forming an electron beam, means for subjecting said beam to high frequency impulses, a plurality of conductive elements electrically insulated from one another, means responsive to control impulses separated by predetermined time intervals for operating said beam to establish on said elements electrical charges which are separately positioned to represent instantaneous values of successive half-cycles of said high frequency impulses, and means separate from said beam-forming means for dissipating said charges at a rate which is low with respect to the rate at which said high frequency impulses follow one another.

3. The combination of means for forming an electron beam, a plurality of elements spaced from one another, means for supplying high frequency impulses, means for producing electrical effects separated by a predetermined time interval, means responsive to the first of said effects for operating said beam to establish on said elements electrical charges which are representative of successive cycles of said high frequency impulses and responsive to the last of said effects for operating said beam to terminate the establishment of said charges.

4. The combination of means for forming an electron beam, a plurality of elements spaced from one another, means for supplying high frequency impulses, means for producing electrical effects separated by a time interval, means responsive to the first of said effects for operating said beam to establish on said elements electrical charges which are representative of successive cycles of said high frequency impulses and responsive to the last of said effects for suppressing said beam to terminate the establishment of said charges, and means including said beam-forming means for counting said charges.

5. The combination of means for forming an electron beam, a plurality of elements spaced from one another, means for supplying high frequency impulses, means for producing electrical effects separated by a time interval, means responsive to the first of said effects for operating said beam to establish on said elements electrical charges which are representative of successive cycles of said high frequency impulses and responsive to the last of said effects for suppressing said beam to terminate the establishment of said charges, and means separate from said beam-forming means for counting said charges at a rate which is slow with respect to that at which they were established.

6. The combination of means for forming an electron beam, a plurality of elements spaced from one another, means for supplying high frequency impulses, means for producing electrical effects separated by a time interval, means responsive to the first of said effects for operating said beam to establish on said elements electrical charges which are representative of successive cycles of said high frequency impulses and responsive to the last of said effects for suppressing said beam to terminate the establishment of said charges, and means responsive to effects intermediate said first and last effects for separating said charges into groups representative of the time intervals between said intermediate effects.

7. In a device for transmitting high frequency impulses only between the occurrence of two events, the combination of means for forming an electron beam, a plurality of conductive elements electrically insulated from one another, and means responsive to the occurrence of one of said events for operating said beam to establish on said elements one after another electrical charges representative of the instantaneous voltage of the positive half-cycles of said impulses and in response to the occurrence of the other of said events for terminating the establishing of said charges.

8. In a device for transmitting high frequency impulses only between the occurrence of two events, the combination of means for forming an electron beam, a plurality of conductive elements electrically insulated from one another, means responsive to the occurrence of one of said events for operating said beam to establish on said elements one after another electrical charges representative of the instantaneous voltage of the positive half-cycles of said impulses and in response to the occurrence of the other of said events for terminating the establishing of said charges, and means for removing said charges one after another at times separated by time intervals which differ in length from the time intervals between the establishment of said charges.

9. The combination of means for producing separate electrical charges at constant frequency, means for starting and stopping the production of said charges in response to the occurrence of events occurring at different times, and means for counting said charges one after another at a frequency which is lower than said constant frequency.

10. In a device for transmitting electrical impulses only between the occurrence of two events, the combination of means for forming an electron beam, a target including a plurality of conductive elements electrically insulated from one another, means responsive to the occurrence of one of said events for establishing one after another and transversely of said elements separate electrical charges each representative of an instantaneous value of the positive half cycles of said impulses, and means for terminating the establishing of said charges in response to the occurrence of the other of said events.

JOHN P. SMITH.